US012607128B2

(12) United States Patent
Stilin et al.

(10) Patent No.: US 12,607,128 B2
(45) Date of Patent: Apr. 21, 2026

(54) COMPOSITE FAN BLADE LEADING EDGE SHEATH WITH ENCAPSULATING EXTENSION

(71) Applicant: Raytheon Technologies Corporation, Farmington, CT (US)

(72) Inventors: Nicholas D. Stilin, Higganum, CT (US); Darin S. Lussier, Guilford, CT (US)

(73) Assignee: RTX Corporation, Farmington, CT (US)

( * ) Notice: Subject to any disclaimer, the term of this patent is extended or adjusted under 35 U.S.C. 154(b) by 365 days.

(21) Appl. No.: 17/085,217

(22) Filed: Oct. 30, 2020

(65) Prior Publication Data

US 2022/0136394 A1 May 5, 2022

(51) Int. Cl.

*F01D 5/28* (2006.01)
*F01D 5/14* (2006.01)
*F01D 5/20* (2006.01)

(52) U.S. Cl.

CPC ............ *F01D 5/282* (2013.01); *F01D 5/141* (2013.01); *F01D 5/20* (2013.01); *F05D 2240/303* (2013.01); *F05D 2240/305* (2013.01); *F05D 2240/306* (2013.01); *F05D 2240/307* (2013.01); *F05D 2260/231* (2013.01); *F05D 2300/603* (2013.01)

(58) Field of Classification Search

CPC . F01D 5/14; F01D 5/141; F01D 5/147; F01D 5/20; F01D 5/282; F01D 11/12; F01D 11/122; F01D 11/125; F05D 2260/231; F05D 2240/303; F05D 2240/305; F05D 2240/306; F05D 2240/307; F05D 2300/603

See application file for complete search history.

(56) References Cited

U.S. PATENT DOCUMENTS

| | | | | |
|---|---|---|---|---|
| 6,413,051 | B1 | 7/2002 | Chou et al. | |
| 6,942,455 | B2 * | 9/2005 | Schmaling | F01D 5/145 244/22 |
| 7,780,420 | B1 * | 8/2010 | Matheny | F01D 5/282 416/241 R |
| 8,376,712 | B2 | 2/2013 | Klinetob et al. | |
| 8,556,579 | B2 | 10/2013 | Jevons | |
| 8,657,570 | B2 * | 2/2014 | Kray | F01D 5/20 416/228 |
| 8,662,834 | B2 * | 3/2014 | Kray | F04D 29/324 416/228 |

(Continued)

*Primary Examiner* — Nathaniel E Wiehe
*Assistant Examiner* — Justin A Pruitt
(74) *Attorney, Agent, or Firm* — Bachman & LaPointe, P.C.

(57) ABSTRACT

A metallic sheath for a composite fan blade includes a body comprising a leading edge portion configured to cover a leading edge of the blade; a top surface adjacent the leading edge; an extension portion proximate the top surface configured to cover a portion of a tip of the blade along an intermediate chord length; an encapsulation portion opposite the top surface configured to couple directly with the tip of the blade; a sheath suction side flank configured to overlap a suction side of the blade; a sheath pressure side flank opposite the suction side flank configured to overlap a pressure side of the blade; and an insulator coupled between the encapsulation portion and the tip of the blade.

10 Claims, 7 Drawing Sheets

(56) References Cited

U.S. PATENT DOCUMENTS

| | | | | |
|---|---|---|---|---|
| 9,702,257 | B2 | 7/2017 | Yagi et al. | |
| 10,066,490 | B2 | 9/2018 | Yagi et al. | |
| 10,408,224 | B2 * | 9/2019 | Strock | F04D 29/388 |
| 10,815,798 | B2 * | 10/2020 | Kray | F01D 5/288 |
| 11,149,590 | B2 * | 10/2021 | Sippel | F01D 25/246 |
| 2014/0064964 | A1 * | 3/2014 | Care | F01D 5/282<br>416/2 |
| 2015/0104324 | A1 | 4/2015 | Yagi et al. | |
| 2015/0337670 | A1 | 11/2015 | Merriman | |
| 2019/0107003 | A1 * | 4/2019 | Sheedy | F01D 11/122 |

* cited by examiner

COMPOSITE FAN BLADE LEADING EDGE SHEATH WITH ENCAPSULATING EXTENSION

BACKGROUND

The present disclosure is directed to encapsulating a composite tip of a fan blade in a modified leading edge sheath. The modified sheath covers the tip of the composite laminate blade body. The modified sheath provides a surface configured to receive a tip treatment.

Composite materials offer potential design improvements in gas turbine engines. Composite materials are used to replace metals in gas turbine engine fan blades because of their high strength and low weight. Most legacy gas turbine engine fan blades are titanium with a thin cross-section. The ductility of titanium fan blades enables the fan to ingest a bird and remain operable or be safely shut down. The thin cross-section allows high levels of aerodynamic efficiency. The same requirements are present for composite fan blades.

A composite airfoil has a root, which connects to the fan mechanism, and a tip opposite the root. A composite airfoil for a turbine engine fan blade is typically designed with a divergent root portion known as a dovetail root. The thickness of the airfoil greatly changes over the length from the tip to the root. This is due to various strength and stiffness requirements in various locations of the airfoil to optimize the performance of the airfoil under various conditions, including a bird strike.

To optimize the efficiency of a fan in a high bypass commercial turbofan engine, the clearance between the blade tips and the fan casing must be minimized to reduce leakage during engine operation. To achieve this, conventional commercial fans are designed with a limited-rub system, such that the tips of the metallic fan blades abrade material from a sacrificial lining on the interior of the fan case to create a minimal, constant thickness gap between the blading and casing.

Ideally, the resulting abraded depth in the sacrificial lining is sufficient to accommodate all of the accumulated manufacturing and operational dimensional variation that exists between the fan blade tips and the fan case. These variations include blade and case size variation and concentricity, as well as case ovalization. The abrading of material from the fan liner by the blade tips during a rub event is most pronounced during initial engine break-in and decreases as the engine accumulates flight cycles.

Unlike conventional metallic fan blades, polymer matrix composite fan blades may be susceptible to damage by elevated temperatures that result from the frictional heating that could occur during the blade to case rub. For this reason, some high bypass commercial fans with composite fan blades employ a no-rub system, whereby interaction between the blading and casing is minimized or eliminated entirely. Unfortunately, the increased radial clearance between blading and casing required in this system results in reduced fan efficiency.

Composite fan blades typically require a no-rub system to avoid elevated temperatures of the polymeric constituents in the fan blade, primarily the laminate composite blade body. Fan efficiency suffers due to the excessive clearances between blading and casing required to minimize or eliminate rubbing.

SUMMARY

In accordance with the present disclosure, there is provided a metallic sheath for a composite fan blade comprising a body comprising: a leading edge portion configured to cover a leading edge of the blade; a top surface adjacent the leading edge; an extension portion proximate the top surface configured to cover a portion of a tip of the blade along an intermediate chord length; an encapsulation portion opposite the top surface configured to couple directly with the tip of the blade; a sheath suction side flank configured to overlap a suction side of the blade; a sheath pressure side flank opposite the suction side flank configured to overlap a pressure side of the blade; and an insulator coupled between the encapsulation portion and the tip of the blade.

A further embodiment of any of the foregoing embodiments may additionally and/or alternatively include the metallic sheath for a composite fan blade further comprises at least one feature formed on the top surface, the at least one feature configured to abrade a fan casing liner.

A further embodiment of any of the foregoing embodiments may additionally and/or alternatively include the at least one feature is selected from the group consisting of surface structures, corrugation, roughness, dimples and contours.

A further embodiment of any of the foregoing embodiments may additionally and/or alternatively include the insulator is configured as a thermal resistor with a thickness adjustable responsive to a predetermined thermal resistance.

A further embodiment of any of the foregoing embodiments may additionally and/or alternatively include the extension portion is extendable for a predetermined intermediate chord length tailored to provide for a tip treatment for abrading a fan case liner to control a blade to fan case clearance.

A further embodiment of any of the foregoing embodiments may additionally and/or alternatively include the metallic sheath for a composite fan blade further comprises a radial thickness dimension in the sheath extension configured to control a heat transfer between the top surface and the blade tip responsive to a predetermined thermal conductivity and a predetermined thermal capacitance of a leading edge sheath material limitation and a composite blade material limitation.

A further embodiment of any of the foregoing embodiments may additionally and/or alternatively include a length of the sheath suction side flank and length of the sheath pressure side flank are configured to allow for an adhesive reserve configured to accommodate a degradation of a bond between the sheath and blade.

In accordance with the present disclosure, there is provided a metallic sheath assembly for a composite fan blade comprising a metallic sheath comprising a body, the body comprising: a leading edge portion configured to cover a leading edge of the blade; a top surface adjacent the leading edge; an extension portion proximate the top surface configured to cover a portion of a tip of the blade along an intermediate chord length; an encapsulation portion opposite the top surface configured to couple directly with the tip of the blade; a sheath suction side flank configured to overlap a suction side of the blade; a sheath pressure side flank opposite the suction side flank configured to overlap a pressure side of the blade; and an insulator coupled between the encapsulation portion and the tip of the blade; a tip cap coupled to the metallic sheath and the tip of the blade and an aft portion of the blade; and a joint formed between the metallic sheath and the tip cap.

A further embodiment of any of the foregoing embodiments may additionally and/or alternatively include the metallic sheath assembly for a composite fan blade further comprising at least one feature formed on the top surface, the at least one feature configured to abrade a fan casing liner.

A further embodiment of any of the foregoing embodiments may additionally and/or alternatively include the insulator is configured to include a thickness adjustable responsive to a predetermined thermal resistance.

A further embodiment of any of the foregoing embodiments may additionally and/or alternatively include the extension portion is extendable for a predetermined intermediate chord length.

A further embodiment of any of the foregoing embodiments may additionally and/or alternatively include the metallic sheath assembly for a composite fan blade further comprising a radial thickness dimension in the sheath extension configured to control a heat transfer between the top surface and the blade tip.

A further embodiment of any of the foregoing embodiments may additionally and/or alternatively include the metallic sheath assembly for a composite fan blade further comprising an adhesive reserve configured to accommodate a degradation of a bond between the metallic sheath and composite fan blade.

In accordance with the present disclosure, there is provided a process for limiting a temperature of a composite fan blade responsive to a rub event between the composite fan blade and a fan casing liner comprising coupling a metallic sheath to the composite fan blade, the metallic sheath comprising a body, the body comprising: a leading edge portion configured to cover a leading edge of the composite fan blade; a top surface adjacent the leading edge; an extension portion proximate the top surface configured to cover a portion of a tip of the composite fan blade along an intermediate chord length; an encapsulation portion opposite the top surface configured to couple directly with the tip of the composite fan blade; a sheath suction side flank configured to overlap a suction side of the composite fan blade; a sheath pressure side flank opposite the suction side flank configured to overlap a pressure side of the composite fan blade; and an insulator coupled between the encapsulation portion and the tip of the composite fan blade; coupling a tip cap to the metallic sheath; coupling the tip cap to the tip of the composite fan blade and to an aft portion of the composite fan blade; and forming a joint between the metallic sheath and the tip cap.

A further embodiment of any of the foregoing embodiments may additionally and/or alternatively include the process further comprising thermally insulating the composite fan blade from a source of thermal energy at the top surface responsive to a rub between the composite fan blade and the fan casing liner.

A further embodiment of any of the foregoing embodiments may additionally and/or alternatively include the process further comprising forming a radial thickness dimension in the sheath extension configured to control a heat transfer between the top surface and the tip of the composite fan blade.

A further embodiment of any of the foregoing embodiments may additionally and/or alternatively include the process further comprising applying a feature to the top surface prior to assembling the metallic sheath onto the composite fan blade.

A further embodiment of any of the foregoing embodiments may additionally and/or alternatively include the step of applying the feature includes use of elevated temperature application processes detrimental to a polymer matrix composite material of the composite fan blade if applied after assembly of the metallic sheath onto the composite fan blade.

A further embodiment of any of the foregoing embodiments may additionally and/or alternatively include the process further comprising limiting the thermal energy transfer between the features and composite fan blade; reducing the frictional area between the top surface and the fan casing liner; contacting the fan casing liner at discrete locations; increasing a thermal resistance between the top surface and the composite fan blade; and limiting the thermal conduction area between the fan casing liner and the top surface.

Other details of the composite tip leading edge sheath are set forth in the following detailed description and the accompanying drawings wherein like reference numerals depict like elements.

DETAILED DESCRIPTION

Figure 1:
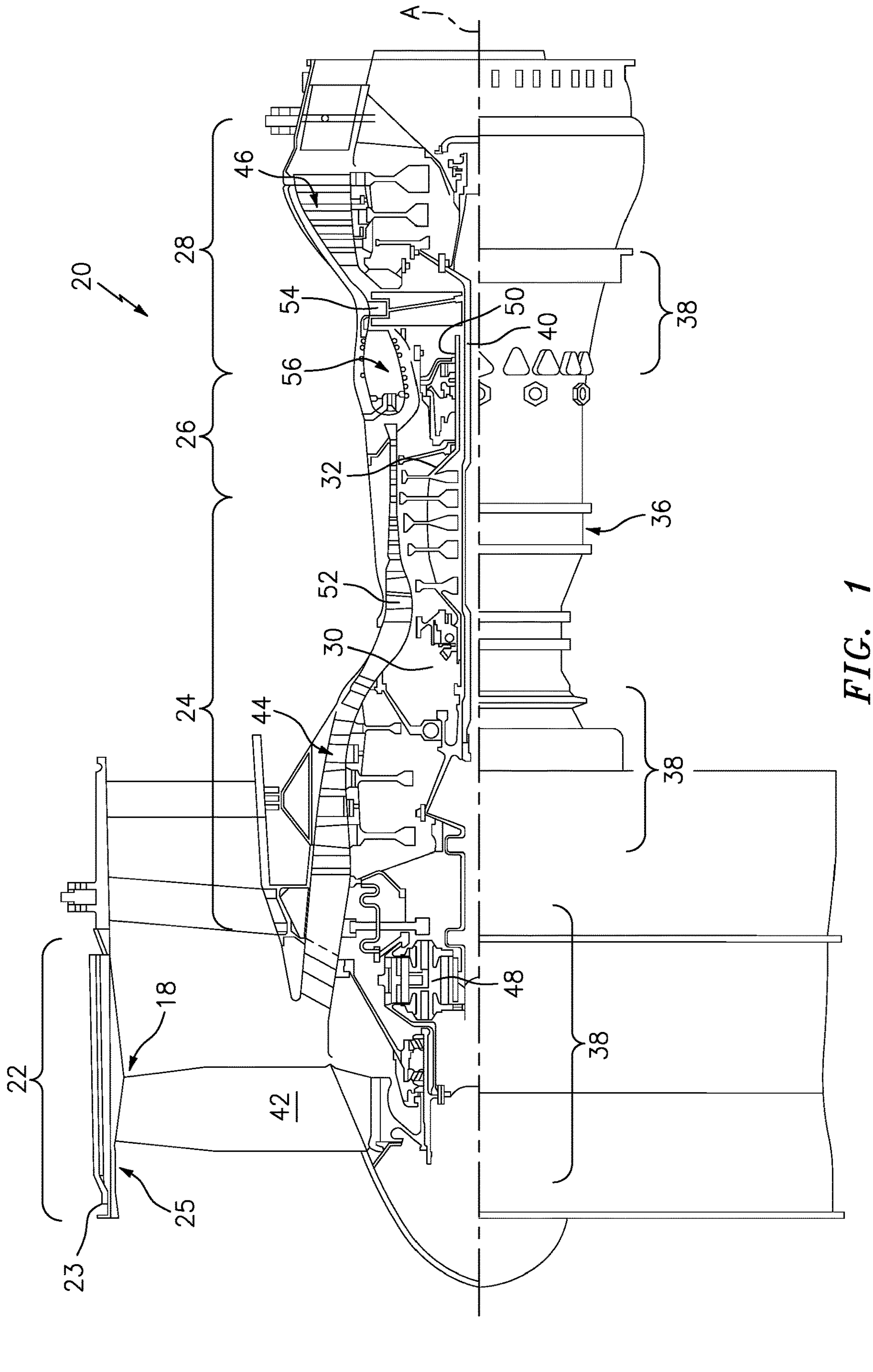
FIG. 1 is a schematic cross-section of a gas turbine engine.

FIG. 1 schematically illustrates a gas turbine engine 20. The gas turbine engine 20 as disclosed herein has a two-spool turbofan that generally incorporates a fan section 22 with fan casing 23 and liner 25, a compressor section 24, a combustor section 26 and a turbine section 28. The fan section 22 drives air along a bypass flow path while the compressor section 24 drives air along a core flow path for compression and communication into the combustor section 26 then expansion through the turbine section 28. Although depicted as a turbofan in the disclosed non-limiting embodiment, it should be appreciated that the concepts described herein are not limited only thereto.

The engine 20 generally includes a low spool 30 and a high spool 32 mounted for rotation around an engine central longitudinal axis A relative to an engine static structure 36 via several bearing compartments 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. The high spool 32 includes an outer shaft 50 that interconnects a high pressure compressor 52 ("HPC") and high pressure turbine 54 ("HPT"). A combustor 56 is arranged between the HPC 52 and the HPT 54. The inner shaft 40 and the outer shaft 50 are concentric and rotate around the engine central longitudinal axis A which is collinear with their longitudinal axes.

Core airflow is compressed by the LPC 44 then the HPC 52, mixed with fuel and burned in the combustor 56, then expanded over the HPT 54 and the LPT 46. The turbines 46, 54 rotationally drive the respective low spool 30 and high spool 32 in response to the expansion. The main engine shafts 40, 50 are supported at a plurality of points by the bearing compartments 38. It should be appreciated that various bearing compartments 38 at various locations may alternatively or additionally be provided.

Figure 2:
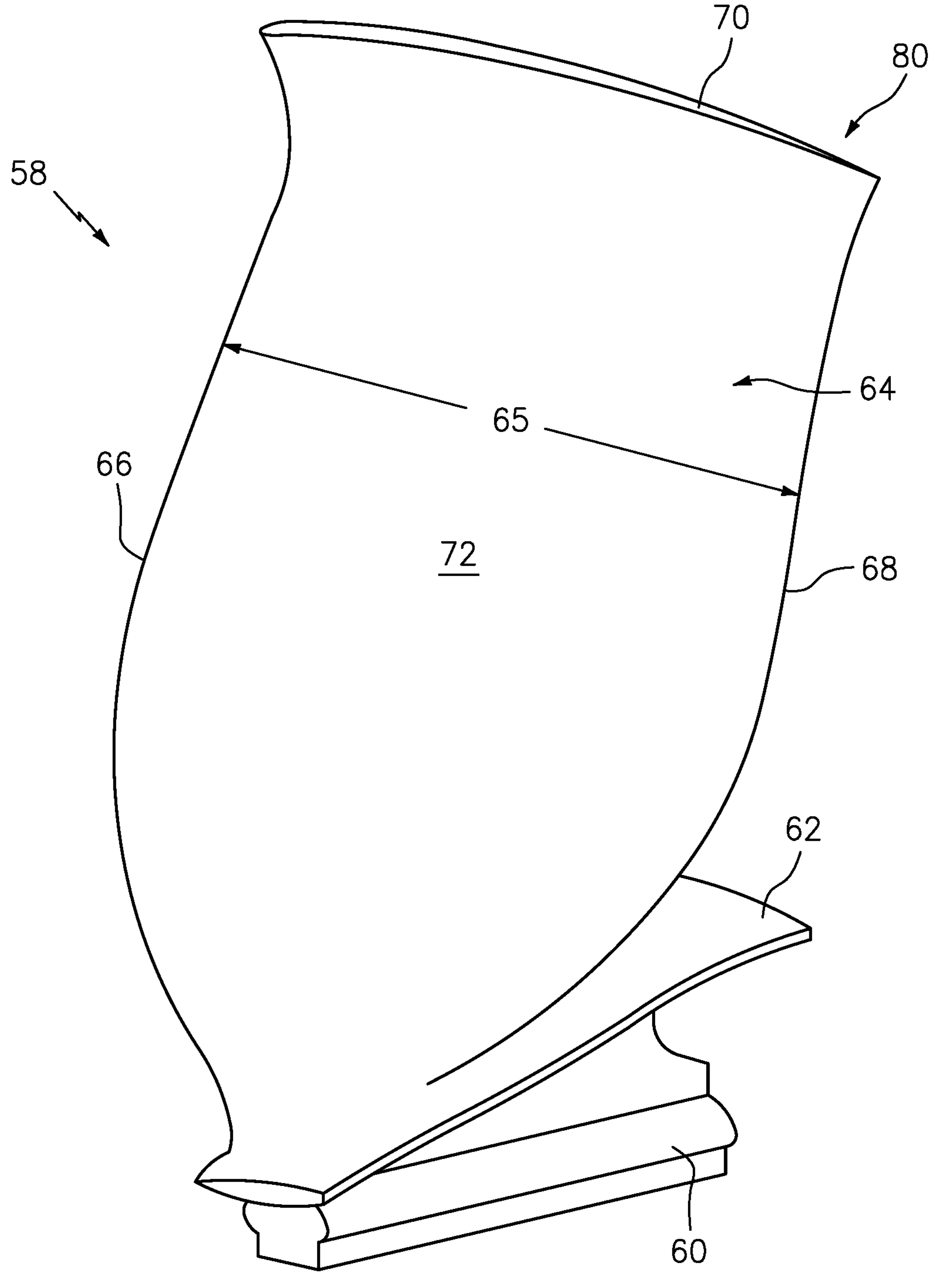
FIG. 2 is a schematic view of a fan blade for use in the gas turbine engine shown in FIG. 1.
Figure 3:
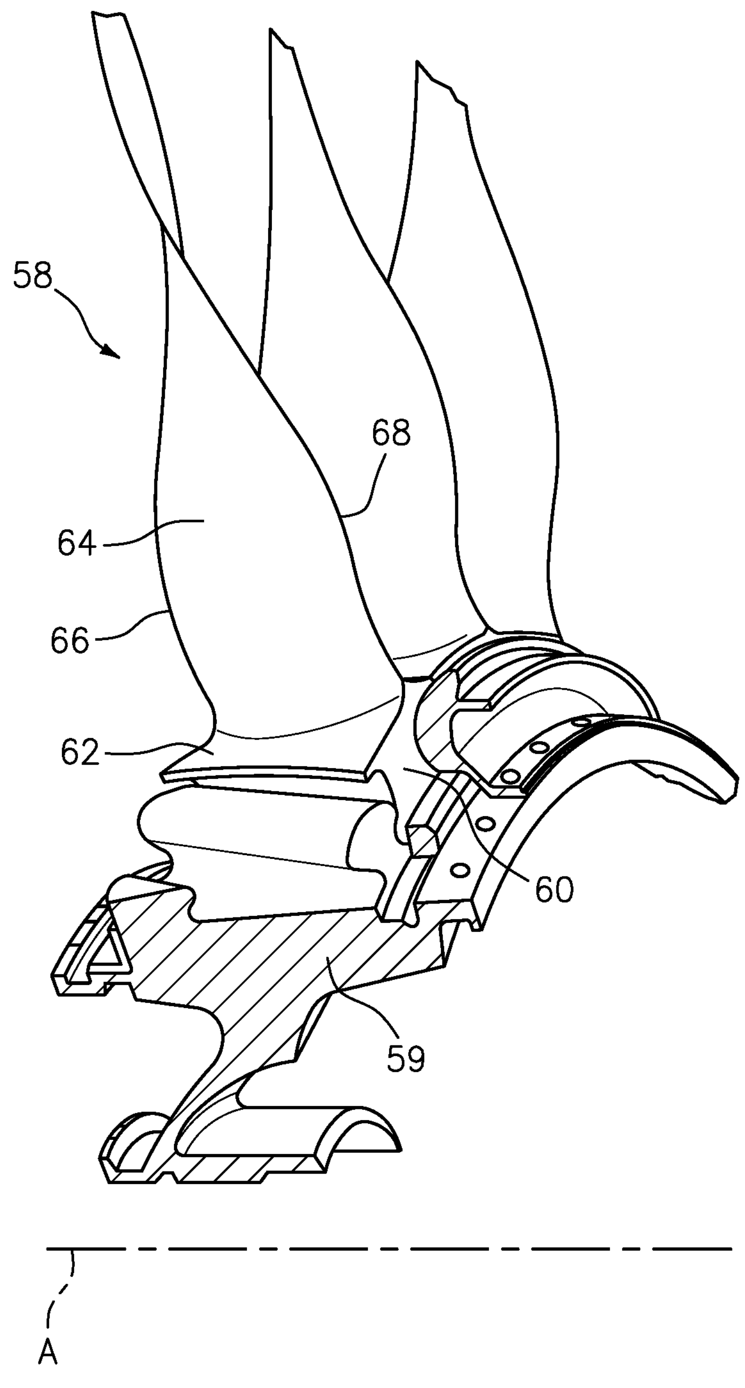
FIG. 3 is a perspective view of a rotor disk with the fan blade of FIG. 2 installed.
Figure 4:
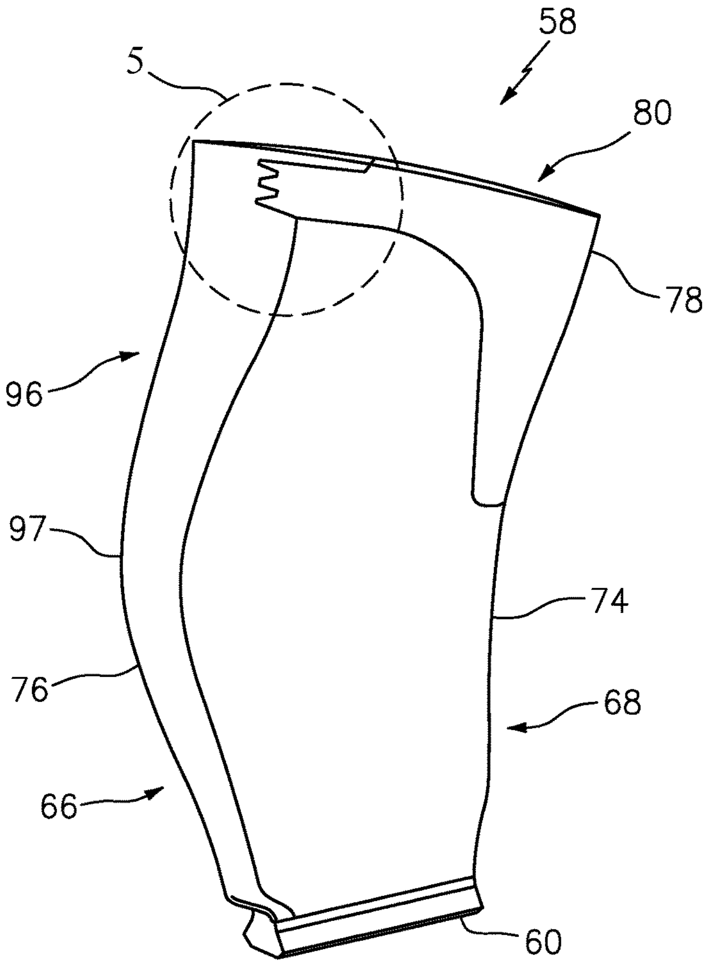
FIG. 4 is a perspective view of a composite fan blade with leading edge sheath.
Figure 5:
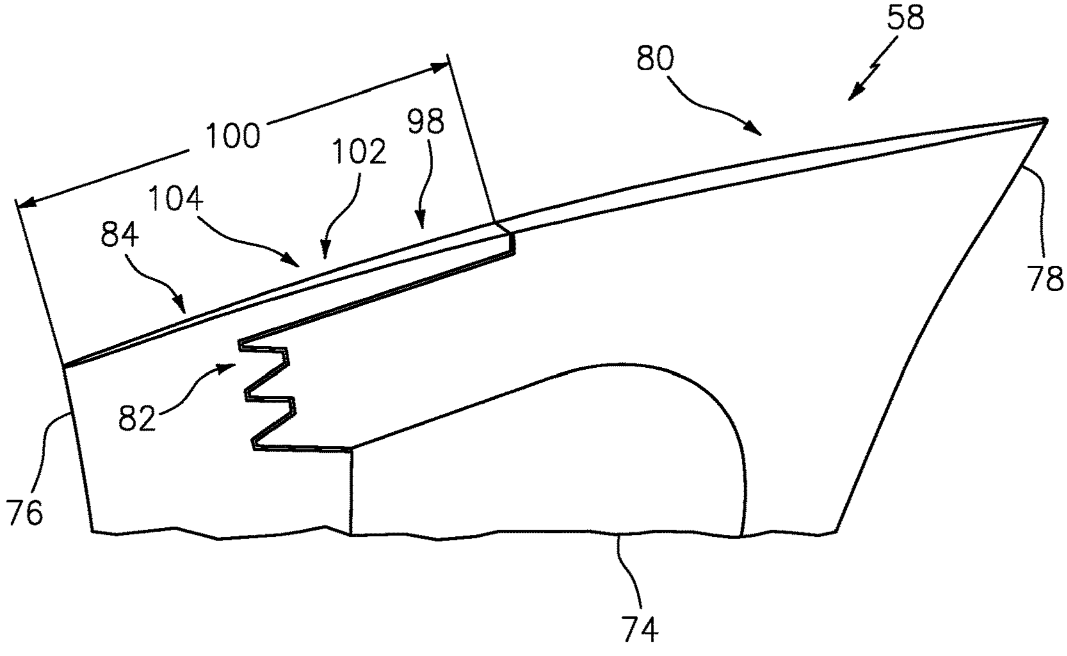
FIG. 5 is an enlarged view of a portion of the composite fan blade with leading edge sheath of FIG. 4.
Figure 6:
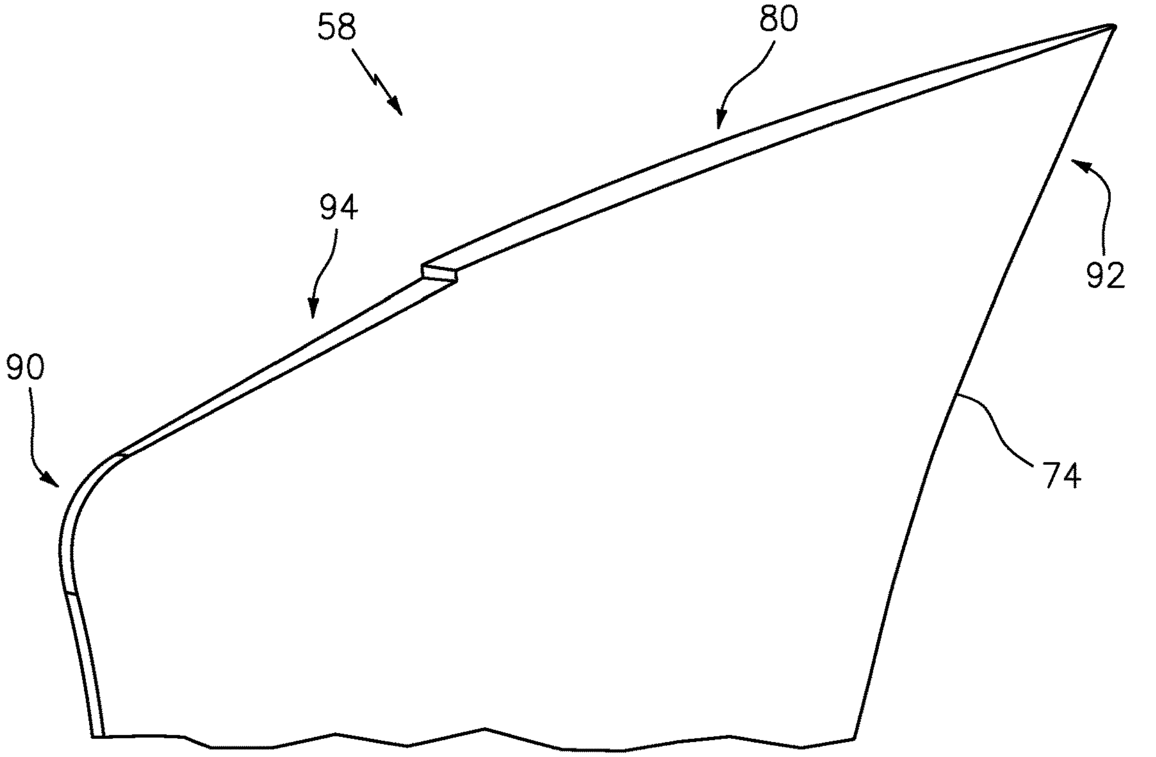
FIG. 6 is a perspective view of the composite fan blade without the leading edge sheath.

Referring also to FIGS. 2 and 3, the fan section 22 includes a plurality of circumferentially spaced fan blades 58 which may be made of a high-strength, low weight material such as an aluminum alloy, titanium alloy, composite material or combinations thereof. It should be understood that although a single fan stage typical of a high bypass gas turbofan engine architecture is illustrated and described in the disclosed embodiments, other stages which have other blades inclusive but not limited to fan blades, high pressure compressor blades and low pressure compressor blades may also benefit from the disclosed process.

Each fan blade 58 generally includes an innermost root portion 60, an intermediate platform portion 62, and an outermost airfoil portion 64. In one form, the root portion 60 defines an attachment such as an inverted fir tree, bulb, or dovetail, so the fan blade 58 is slidably received in a complimentary configured recess provided in a fan rotor 59 (FIG. 3). The platform portion 62 generally separates the root portion 60 and the airfoil portion 64 to define an inner boundary of the air flow path. The airfoil portion 64 defines a blade chord 65 between a leading edge 66, which may include various forward and/or aft sweep configurations, and a trailing edge 68. A concave pressure side 70 and a convex suction side 72 are defined between the leading edge 66 and the trailing edge 68. Although a fan blade 58 is illustrated in the disclosed non-limiting embodiment, compressor blades, turbofan blades, turboprop propeller blades, tilt rotor props, vanes, struts, and other airfoils may benefit from the disclosed sheath.

Referring also to FIG. 4 through FIG. 9, the fan blade 58 can be constructed from composite material 74. The composite material 74 can include polymer matrix composite material for fan blades 58. A leading edge sheath 76 can be coupled to the fan blade 58 proximate the leading edge 66 of the fan blade 58. The leading edge sheath 76 can include metal material. The leading edge sheath 76 encapsulates the fan blade 58 polymer matrix composite material 74 and thermally isolates the polymer matrix composite material 74 from the thermal energy developed from a rub between the leading edge sheath 76 and the fan casing 23. A tip cap 78 is also shown coupled to the fan blade 58 proximate a tip 80 of the fan blade 58. The tip cap 78 can be made of metal material.

Figure 7:
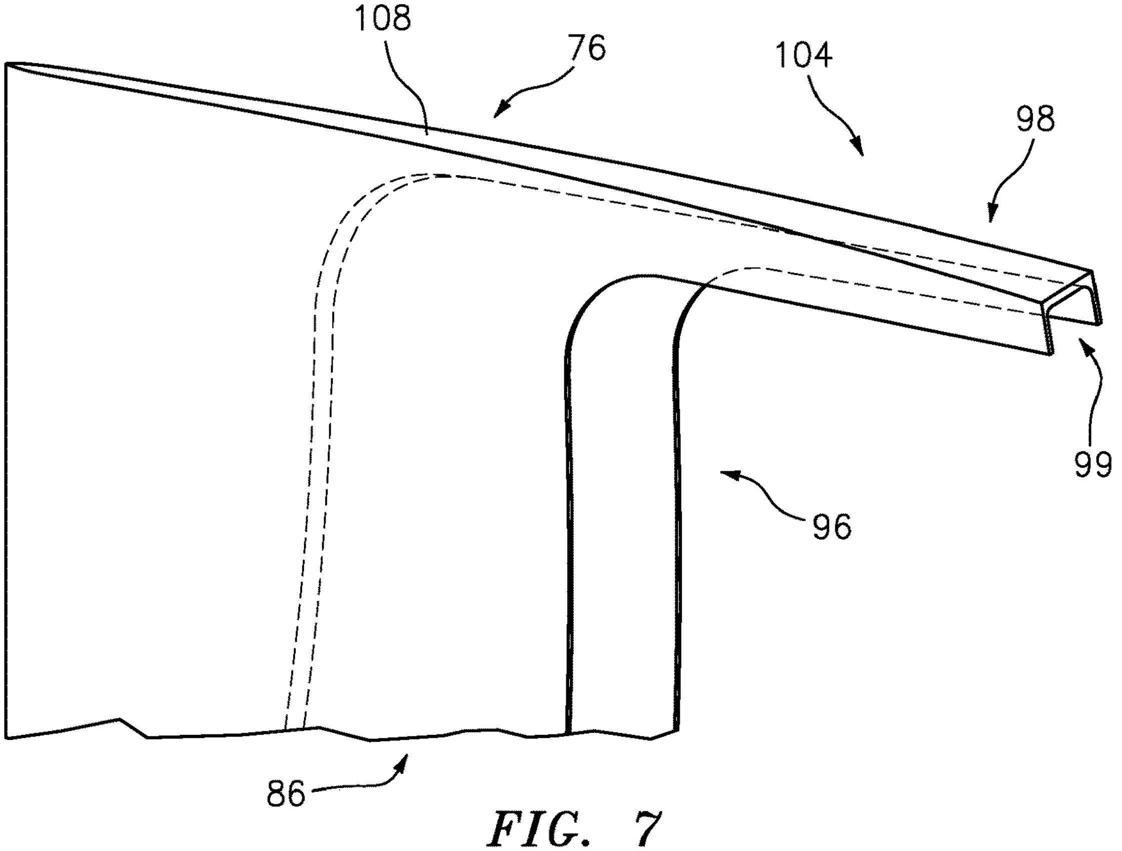
FIG. 7 is a perspective view of the leading edge sheath.
Figure 8:
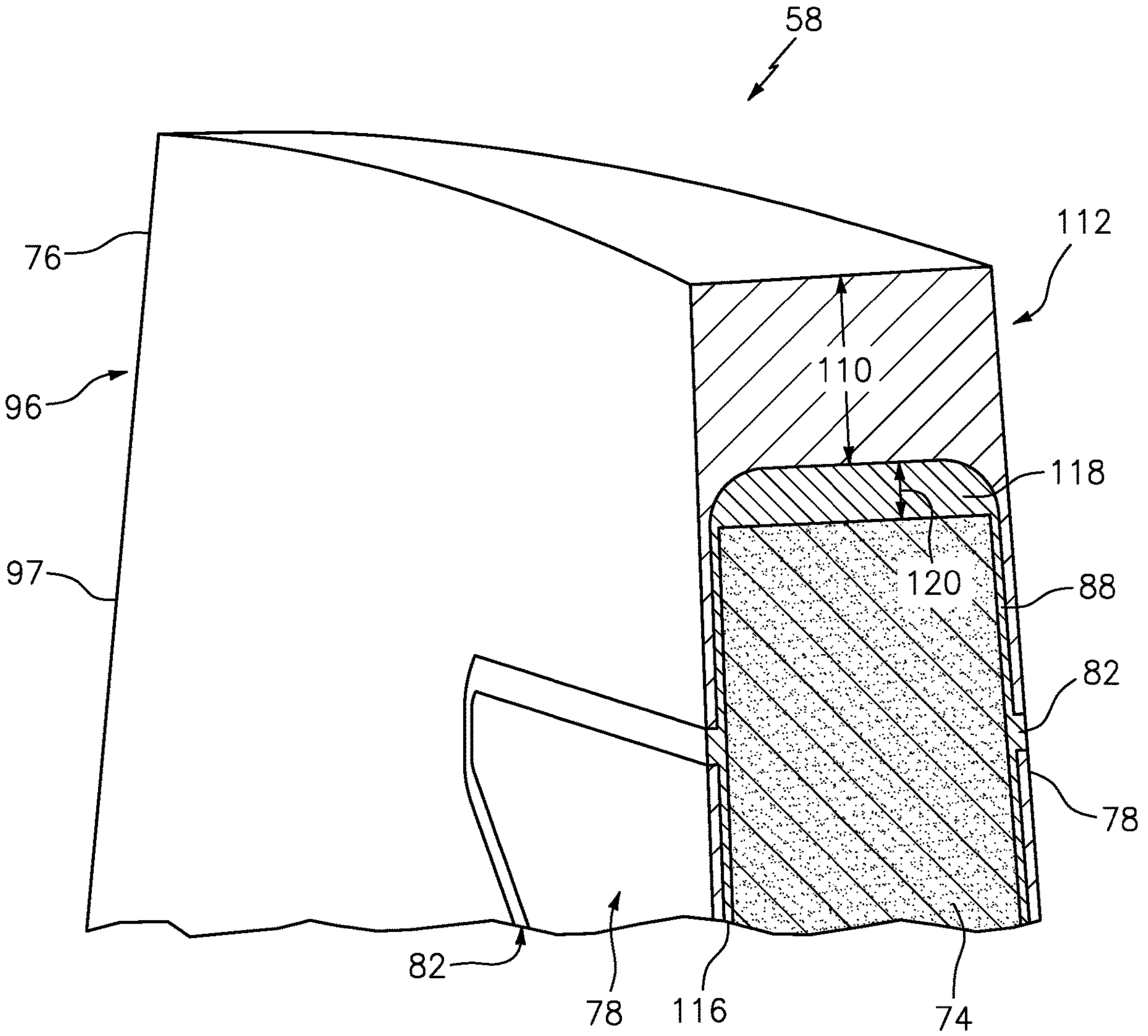
FIG. 8 is a partial view of a section of a portion of the composite fan blade with leading edge sheath and tip cap.
Figure 9:
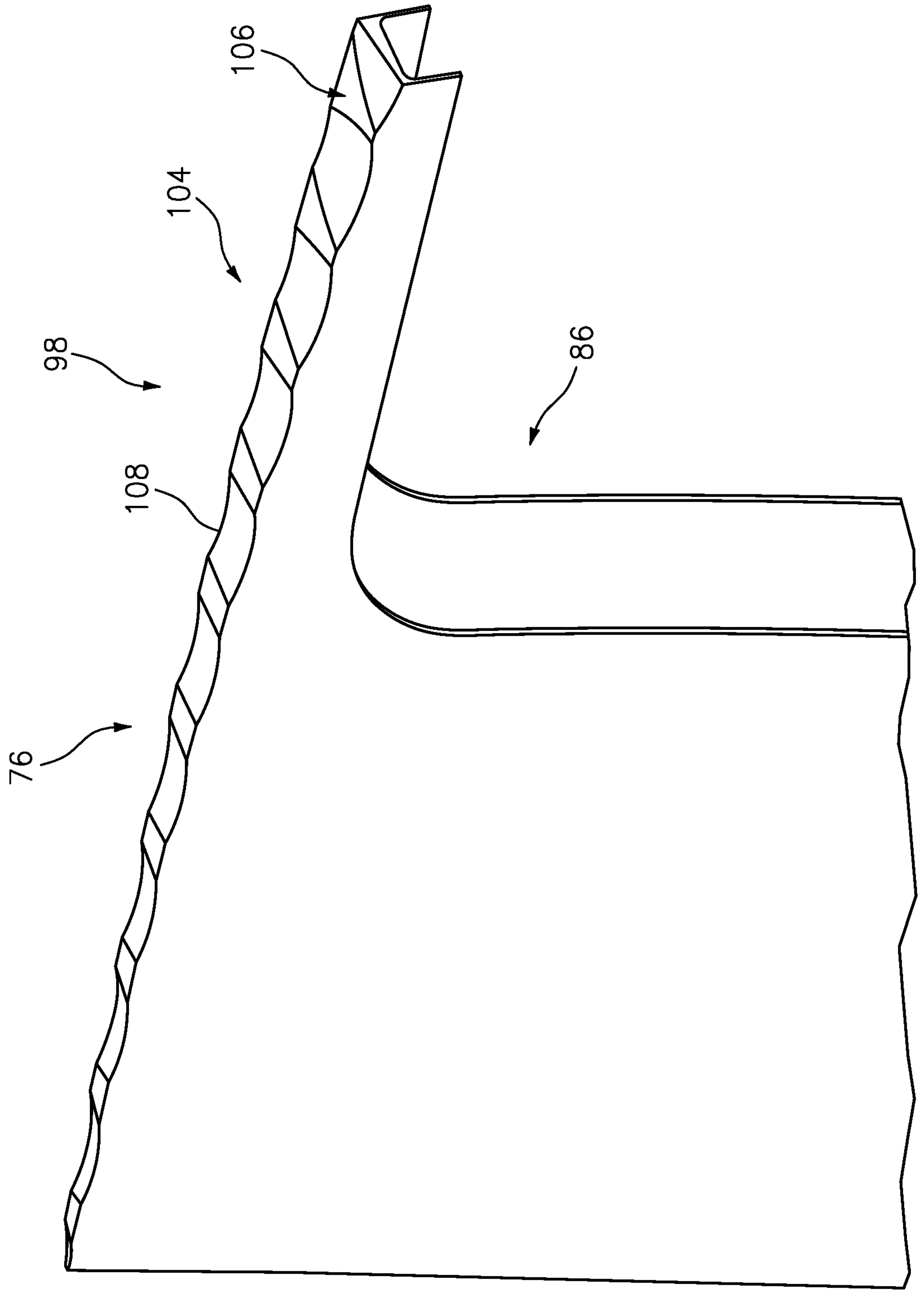
FIG. 9 is a perspective view of the leading edge sheath with surface features.

The tip cap 78 and leading edge sheath 76 can be joined at a joint 82. The joint 82 can comprise a finger joint as shown on FIG. 5, or as a butt joint 86 (FIG. 7 or 9). The joint 82 can include a staggered configuration as shown in FIGS. 7 and 9. The leading edge sheath 76 and tip cap 78 can be adhesively bonded with an adhesive 88 to the composite material blade 74 covering portions of the forward 90, aft 92 and radially outboard 94 portions of the fan blade 58.

The leading edge sheath 76 includes a body 96 with a leading edge portion 97 and an extension portion 98 with an encapsulation portion 99. The leading edge portion 97 extends proximate the blade leading edge 66. The extension portion 98 and encapsulation portion 99 encapsulates and extends over the tip 80 a distance of an intermediate airfoil chord length 100. The extension portion 98 can be cantilevered extending aft along the blade tip 80. The extension portion 98 intermediate chord length 100 can be tailored responsive to a predetermined abrading length needed for the case liner 25. To allow installation of the leading edge sheath 76 with cantilevered encapsulating extension portion 98 onto the laminate composite blade body 96, the maximum value of the intermediate chord length 100 is that which coincides with the maximum thickness of the laminate composite blade body 96. In an exemplary embodiment, the extension portion 98 can terminate at a location along the tip 80 where the airfoil of the blade 58 thickness is increasing or remains constant with respect to the chord length 65

The composite blade 58 can be machined to receive the leading edge sheath 76 proximate the forward portion 90, radially outboard 94 portion and along part of the tip 80 in order to reduce the quantity of machining to be performed on the leading edge sheath 76. The tip cap 78 can have a truncated section 102 to allow for the leading edge sheath 76 extension portion 98 to extend over the truncated section 102. The leading edge sheath 76 extension portion 98 and encapsulation portion 99 encapsulates the tip 80 to optimize the length with respect to the weight and cost of the design as well as allow for implementation of a limited-rub-system 104.

The limited-rub system 104 of the leading edge sheath 76 includes tip treatment features, or simply features 106. The features 106 are configured to abrade the fan casing 23 liner 25 and allow for limited clearance 18 between the blade 58 and casing 23. The features 106 can include surface structures, such as corrugation, roughness, dimples, contours and the like. The extension portion 98 is configured to provide a robust metallic top surface 108 to support the features 106. The top surface 108 allows for abrasive features 106 instead of being supported on the composite tip 80 material. The features 106 can allow for contacting the fan casing liner 25 in small, discrete locations, thus limiting the generation of thermal energy by reducing the frictional area as well as increasing the thermal resistance by limiting the thermal conduction area.

The features 106, such as tip treatment, can be applied to the top surface 108 prior to assembling the leading edge sheath 76 onto the composite blade 58. Application of the features 106 to the leading edge sheath 76, independently of the composite blade 58, allows for cost reduction as well as permitting the use of elevated temperature application processes that could be detrimental to the polymer matrix composite material of the composite blade 58 if applied after assembly of the leading edge sheath 78 onto the composite blade 58. Examples of elevated temperature processes used for applying tip features 106 can include curing of polyimide resins or adhesives, such as polyimide matrix tip treatment, as well as plasma spraying metal matrix tip treatment.

The leading edge sheath 76 can include a radial thickness 110. The dimension of the radial thickness 110 can be increased or decreased responsive to the required thermal conductivity and thermal capacitance of the leading edge sheath 76 and composite blade 58 material limitations. Adjusting the radial thickness 110 can limit the maximum temperature exposure of the adjacent composite material 74 due to thermal energy generated during transient rub events of the blade 58 and casing liner 25. The radial thickness 110 can be constant along the extension portion 98 or tapered to balance the requirements for thermal conductivity, thermal capacitance, material strength and weight.

The leading edge sheath 76 can include a sheath pressure side flank 112 and sheath suction side flank 114 opposite the pressure side 112 and corresponding to the pressure side 70 and suction side 72 of the blade 58 respectively. Each of the sheath pressure side flank 112 and sheath suction side flank 114 extend along the blade 58 and permit the adhesive 88 between the sheath 76 and blade composite 74 to react to the sheath 76 centrifugal load in shear and not in tension. The length of each sheath flank, 112, 114, can be dimensioned to allow for an adhesive reserve 116 configured to accommodate degradation of the bond between the sheath 76 and blade 58 over the lifetime of the blade 58. The length of the sheath flanks 112, 114 that adhere the leading edge sheath 76 to the fan blade 58 can be tailored such that the peak adhesive shear stress in the adhesive 88, due to operational and impact loads, should be within the strength allowable for the adhesive 88. A trough of minimally stressed adhesive 88 is present to take load as the adhesive bond environmentally deteriorates or suffers operational damage while in service. The shear stress is highest at the ends of the sheath flanks 112, 114, and at the tip 80 of the blade 58, and decreases in the interior of the bond of the adhesive 88.

A thermal isolator or simply insulator 118 can be formed between the leading edge sheath 76 extension 98 and the tip 80 of the blade 58. The insulator 118 can act as a thermal resistor with a thickness 120 that can be adjusted responsive to a predetermined thermal resistance desired. The insulator 118 can be formed of insulation material 122. The insulation material 122 can include high temperature polyimide foam or resin and the like to increase thermal resistance. The insulator 118 can allow for a broader selection of materials that make up the extension portion 98, as well as the features 106, while providing protection for the polymeric constituents of the blade 58 from elevated temperatures during engine operation with blade 58 to case 23 rubs. The radial thickness 110 distribution of the encapsulation portion 99 wall and adhesive layer 88 can be sized to limit the maximum thickness of the laminate composite body 96 as a result of a transient rub event. The top surface 108 of the extension portion 98 can increase in temperature during a rub event due to frictional heating caused by contact of the blade 58 with the abradable surface of the fan casing liner 25. The radial temperature distribution in the leading edge sheath 76 through the radial thickness 110, adhesive 88, insulator 118 and laminate composite 74 can be determined by assuming a one dimensional heat flow in a radial direction. The temperature at any radial location in the leading edge sheath 76, adhesive 88, insulator 118 or laminate composite 74 can be obtained from: $T(x, t)=T_o+(T_i-T_o)\ \mathrm{erf}\ (x/(2\mathrm{sqrt}(\alpha\tau)))$; where $T_o$=elevated temperature of tip treatment features due to frictional heating; $T_i$=initial steady state temperature of airfoil; x=radial distance from top surface of leading edge sheath, adhesive or laminate composite; $\alpha$=thermal diffusivity of leading edge sheath, adhesive, insulator, or laminate composite; $\tau$=elapsed time.

The disclosed leading edge sheath provides the technical advantage of supporting a tipping treatment to efficiently remove material from the liner in the fan case to form a minimal gap between blading and casing without subjecting the composite constituents of the fan blade to excessive temperatures.

The disclosed leading edge sheath provides the technical advantage of covering the forward portion of the airfoil tip where the maximum pressure differential is realized across the airfoil.

The disclosed leading edge sheath provides the technical advantage of including a sheath extension having a predetermined intermediate chord length tailored to provide for the desired tip treatment for abrading the fan case liner to control the blade to case clearance.

The disclosed leading edge sheath provides the technical advantage of including a robust metallic top surface configured with features, such as tip treatment for improved abrading.

The disclosed leading edge sheath provides the technical advantage of allowing for tip treatment to be applied prior to installation to allow for elevated temperature applications without the risk of damaging the composite blade materials.

The disclosed leading edge sheath provides the technical advantage of having a radial thickness dimension in the sheath extension configured to control the heat transfer and thus the maximum temperature of the adjacent composite blade material.

The disclosed leading edge sheath provides the technical advantage of sheath flanks of the sheath extension that can be adjusted to include an insulator between the sheath material and the composite blade material.

The disclosed leading edge sheath provides the technical advantage of including a thermally resistant material with the insulator.

The disclosed leading edge sheath provides the technical advantage of including surface features on the outer surface of the sheath to minimize contact area with the fan case liner and reducing heat generation.

There has been provided a composite tip leading edge sheath. While the composite tip leading edge sheath has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A metallic sheath assembly for a composite fan blade comprising:

- a metallic sheath comprising a body, said body comprising:
- a leading edge portion configured to cover a leading edge of the blade;
- a top surface adjacent the leading edge, at least one feature formed on said top surface, said at least one feature configured to abrade a fan casing liner;
- an extension portion proximate the top surface configured to cover a portion of a tip of the blade along an intermediate chord length;
- an encapsulation portion opposite said top surface configured to couple directly with the tip of the blade;
- a sheath suction side flank configured to overlap a suction side of the blade;
- a sheath pressure side flank opposite said suction side flank configured to overlap a pressure side of the blade; and
- an insulator coupled between the encapsulation portion and the tip of the blade;
- a tip cap coupled to said metallic sheath and the tip of the blade and an aft portion of the blade wherein the tip cap comprises a truncated section structured for the leading edge sheath extension portion to extend over the truncated section;
- a joint formed between said metallic sheath and said tip cap, the joint comprising a finger joint; and
- an adhesive reserve between the metallic sheath and the composite fan blade, wherein the sheath suction side flank and the sheath pressure side flank extend along the blade and permit the adhesive reserve between the metallic sheath and the composite fan blade to react to a sheath centrifugal load in shear in the absence of tension.

2. The metallic sheath assembly for a composite fan blade according to claim 1, wherein said insulator is configured to include a thickness adjustable responsive to a predetermined thermal resistance.

3. The metallic sheath assembly for a composite fan blade according to claim 1, wherein said extension portion is extendable for a predetermined intermediate chord length.

4. The metallic sheath assembly for a composite fan blade according to claim 1, further comprising:

a radial thickness dimension in the sheath extension configured to control a heat transfer between the top surface and the blade tip.

5. A process for limiting a temperature of a composite fan blade responsive to a rub event between the composite fan blade and a fan casing liner comprising:

coupling a metallic sheath to the composite fan blade, said metallic sheath comprising a body, said body comprising:

a leading edge portion configured to cover a leading edge of the composite fan blade;

a top surface adjacent the leading edge;

an extension portion proximate the top surface configured to cover a portion of a tip of the composite fan blade along an intermediate chord length;

an encapsulation portion opposite said top surface configured to couple directly with the tip of the composite fan blade;

a sheath suction side flank configured to overlap a suction side of the composite fan blade;

a sheath pressure side flank opposite said suction side flank configured to overlap a pressure side of the composite fan blade; and an insulator coupled between the encapsulation portion and the tip of the composite fan blade;

coupling a tip cap to said metallic sheath, wherein the tip cap comprises a truncated section structured for the leading edge sheath extension portion to extend over the truncated section;

coupling the tip cap to the tip of the composite fan blade and to an aft portion of the composite fan blade; and forming a joint between said metallic sheath and said tip cap, the joint comprising a finger joint; and coupling an adhesive reserve between the metallic sheath and the composite fan blade, the adhesive reserve configured to accommodate a degradation of a bond between the metallic sheath and the composite fan blade, wherein a length of the sheath suction side flank and the sheath pressure side flank that adhere the leading edge sheath to the composite fan blade are configured such that a peak adhesive shear stress in the adhesive, due to operational and impact loads, is within a strength allowable for the adhesive.

6. The process of claim 5, further comprising:

thermally insulating the composite fan blade from a source of thermal energy at the top surface responsive to a rub between the composite fan blade and the fan casing liner.

7. The process of claim 5, further comprising:

forming a radial thickness dimension in the sheath extension configured to control a heat transfer between the top surface and the tip of the composite fan blade.

8. The process of claim 5, further comprising:

applying a feature to the top surface prior to assembling the metallic sheath onto the composite fan blade.

9. The process of claim 8, wherein the step of applying the feature includes use of elevated temperature application processes detrimental to a polymer matrix composite material of the composite fan blade if applied after assembly of the metallic sheath onto the composite fan blade.

10. The process of claim 5, further comprising:

limiting the thermal energy transfer between the features and composite fan blade;

reducing the frictional area between the top surface and the fan casing liner;

contacting the fan casing liner at discrete locations;

increasing a thermal resistance between said top surface and said composite fan blade; and limiting the thermal conduction area between said fan casing liner and said top surface.

* * * * *